US012756808B2

(12) United States Patent
Yan et al.

(10) Patent No.: US 12,756,808 B2
(45) Date of Patent: Oct. 6, 2026

(54) METHOD AND IMAGE DEVICE TO OBTAIN IMAGE OF WATER SHOOTING SCENE USING COLOR TEMPERATURE DATA, AND PERFORMING WHITE BALANCE PROCESS

(71) Applicant: SZ DJI TECHNOLOGY CO., LTD., Shenzhen (CN)

(72) Inventors: Yimin Yan, Shenzhen (CN); Shouqian Han, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 180 days.

(21) Appl. No.: 18/627,449

(22) Filed: Apr. 5, 2024

(65) Prior Publication Data

US 2024/0251066 A1 Jul. 25, 2024

Related U.S. Application Data

(63) Continuation of application No. PCT/CN2021/126852, filed on Oct. 27, 2021.

(51) Int. Cl.
*H04N 9/73* (2023.01)
*G06T 7/90* (2017.01)
*G06V 10/56* (2022.01)
*G06V 10/60* (2022.01)
(Continued)

(52) U.S. Cl.
CPC ................. *H04N 9/73* (2013.01); *G06T 7/90* (2017.01); *G06V 10/56* (2022.01); *G06V 10/60* (2022.01); *G06V 10/764* (2022.01); *G06T 2207/10024* (2013.01); *H04N 1/60* (2013.01)

(58) Field of Classification Search
None
See application file for complete search history.

(56) References Cited

U.S. PATENT DOCUMENTS 7,522,191 B2 * 4/2009 Hara ...................... H04N 23/88 348/81
2004/0095478 A1 5/2004 Takano et al.
(Continued)

FOREIGN PATENT DOCUMENTS

CN 102271218 A 12/2011
CN 110460826 A 11/2019
(Continued)

OTHER PUBLICATIONS

International Search Report and Written Opinion mailed on Jul. 18, 2022, received for PCT Application PCT/CN2021/126852, filed on Oct. 27, 2021, 11 pages including English Translation.

*Primary Examiner* — Haris Sabah
(74) *Attorney, Agent, or Firm* — ANOVA LAW GROUP, PLLC

(57) ABSTRACT

Imaging method and imaging device. The imaging method includes: obtaining an original image of a current shooting scene; identifying a result of identification of the current shooting scene based on a color temperature data, wherein the result of identification includes in an underwater scene or not in an underwater scene, and the color temperature data is obtained by a color temperature sensor on the current shooting scene; and performing a white balance process on the original image based on the result of identification to obtain a processed image of the current shooting scene.

20 Claims, 6 Drawing Sheets

(51) Int. Cl.
*G06V 10/764* (2022.01)
*H04N 1/60* (2006.01)

(56) References Cited

U.S. PATENT DOCUMENTS

| | | | | |
|---|---|---|---|---|
| 2012/0075458 | A1* | 3/2012 | Kino | H04N 7/183 348/81 |
| 2012/0236173 | A1* | 9/2012 | Telek | H04N 23/62 348/E9.051 |
| 2014/0071264 | A1* | 3/2014 | Seo | H04N 23/88 348/81 |
| 2019/0045161 | A1 | 2/2019 | Krestyannikov et al. | |
| 2019/0095713 | A1* | 3/2019 | Leroy | G06V 10/56 |
| 2021/0274102 | A1 | 9/2021 | Kadoi et al. | |

FOREIGN PATENT DOCUMENTS

| | | | |
|---|---|---|---|
| CN | 111163302 | A | 5/2020 |
| CN | 111602390 | A | 8/2020 |
| CN | 111699671 | A | 9/2020 |
| CN | 112601063 | A | 4/2021 |
| CN | 113329217 | A | 8/2021 |
| CN | 113497927 | A | 10/2021 |
| JP | 2002-354498 | A | 12/2002 |
| JP | 2004229154 | A | 8/2004 |
| JP | 2009055077 | A | 3/2009 |
| JP | 2013021518 | A | 1/2013 |
| JP | 2014103690 | A | 6/2014 |
| WO | 2020237615 | A1 | 12/2020 |
| WO | 2021104352 | A1 | 6/2021 |

* cited by examiner

METHOD AND IMAGE DEVICE TO OBTAIN IMAGE OF WATER SHOOTING SCENE USING COLOR TEMPERATURE DATA, AND PERFORMING WHITE BALANCE PROCESS

CROSS-REFERENCE TO RELATED APPLICATION

The present application is a continuation of International Application No. PCT/CN2021/126852, filed Oct. 27, 2021, the entire contents of which being incorporated herein by reference in its entirety.

TECHNICAL FIELD

The present disclosure relates to the field of electronic technology, and in particular, to an imaging method and an imaging device for a wading scene.

BACKGROUND

The improvement of waterproof performance of an imaging device enables the user to shoot in the wading scene. However, unlike land shooting, when shooting in the wading scene, due to influence of water environment, the image will appear that, for example, the color temperature is too high and other problems. Thus, it is necessary to adjust imaging strategy for the wading scene, and related technology needs to be artificially set up for the wading scene shooting mode and then shoot.

SUMMARY

Some embodiments of the present disclosure provide a method of imaging a wading scene, an imaging device, and a computer-readable storage medium.

According to a first aspect of embodiments of the present disclosure, there is provided a method of imaging a water-wading scene, comprising: obtaining an original image of a current shooting scene; identifying whether the current shooting scene is an underwater scene by using color temperature data, wherein the color temperature data is obtained by a color temperature sensor for the current shooting scene; and performing a white balance process on the original image according to the identification result to obtain a processed image of the current shooting scene.

According to a second aspect of embodiments of the present disclosure, there is provided a method of imaging a water-wading scene, comprising: obtaining an original image of a current shooting scene; recognizing whether the current shooting scene is an underwater scene by using one or more parameters of the original image, wherein the one or more parameters comprise at least one of an underwater area percentage, an overwater area percentage, a color temperature value, or a luminance value; and, according to the identification result, perform a white balance process on the original image to obtain a processed image of the current shooting scene.

According to a third aspect of embodiments of the present disclosure, there is provided an imaging device comprising: an imaging sensor for obtaining an original image of a current shooting scene; a color temperature sensor for obtaining color temperature data of the current shooting scene; an processor; a memory storing a computer program that is executable by the processor; wherein the processor, in executing the computer program, implements the following step of identifying whether the current shooting scene is an underwater scene using the color temperature data, and performing a white balance process on the original image according to the identification result to obtain a processed image of the current shooting scene.

According to a fourth aspect of embodiments of the present disclosure, there is provided an imaging device comprising: an imaging sensor for obtaining an original image of a current shooting scene; an processor; a memory storing a computer program executable by the processor; wherein the processor is used to realize the steps of: recognizing whether or not the current shooting scene is an underwater scene using one or more parameters of the original image, wherein the one or more parameters include at least one of an underwater area percentage, an overwater area percentage, a color temperature value, or a luminance value; and performing a white balance process on the original image according to the identification result to obtain a processed image of the current shooting scene.

According to a fifth aspect of embodiments of the present disclosure, there is provided a computer-readable storage medium having stored thereon a computer program, the computer program, when executed by a computer, realizing the method described in the first aspect or the second aspect of embodiments of the present disclosure.

The imaging method, imaging device, and computer-readable storage medium for a water-related scene according to embodiments of the present disclosure are capable of automatically recognizing whether the current shooting scene is an underwater scene and carrying out corresponding white balance processing according to the identification result, which is convenient to operate and can obtain better imaging effect for a water-related scene.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
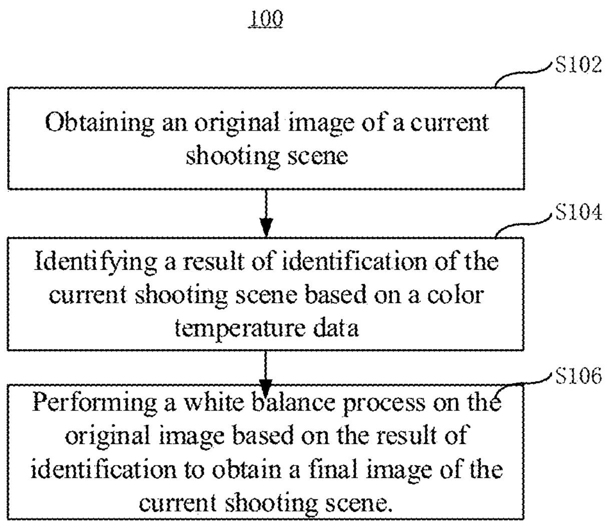
FIG. 1 shows a flowchart of a method of imaging a wading scene according to an embodiment of the present disclosure.

In order to make the purpose, technical solutions and advantages of the present disclosure clearer, the technical solutions of the present disclosure will be described clearly and completely in the following in conjunction with the accompanying drawings of the embodiments of the present disclosure. Obviously, the described embodiment is one embodiment of the present disclosure and not all of the embodiments. Based on the described embodiment of the present disclosure, all other embodiments obtained by a person of ordinary skill in the art without the need for creative labor fall within the scope of protection of the present disclosure.

Exemplary embodiments will be described herein in detail, examples of which are represented in the accompanying drawings. When the following description relates to the accompanying drawings, the same numerals in the different accompanying drawings indicate the same or similar elements unless otherwise indicated. The embodiments described in the following exemplary embodiments do not represent all embodiments consistent with the present disclosure. Rather, they are only examples of apparatuses and methods consistent with some aspects of this disclosure as detailed in the appended claims.

It should be noted that, unless otherwise defined, technical or scientific terms used in this disclosure should have the ordinary meaning understood by a person of ordinary skill in the field to which this disclosure belongs. The "first" and "second" descriptions are only used to distinguish similar objects, and are not to be understood as indicating or implying their relative importance, order of priority, or implicitly specifying the number of technical features indicated, and it should be understood that the data of the "first" and "second" descriptions are interchangeable under appropriate circumstances.

If the word "and/or" appears throughout the text, it means that it includes three parallel programs, for example, "A and/or B", which includes program A, or program B, or a program that meets both A and B.

Some of the technical terms covered below are first defined.

Color Temperature

Color temperature (CT) refers to the color that a non-luminous black object—an absolute black body—radiates as the temperature increases after being heated. As the temperature rises, the black body will first emit red light, and as the temperature continues to rise, it will become brighter and brighter until it turns into yellow light, white light, and finally blue light. CT is mainly in Kelvin temperature to express the color of the light, and its unit is K. The color temperature of the black body is the temperature at which the light is emitted.

Color Temperature Sensor

Color temperature sensors may refer to photoelectric sensors containing multiple channels that sense spectral energy at different wavelengths, generally sensing spectral information from 380 nm to 1100 nm (or even a wider range of wavelengths).

Correlated Color Temperature

Correlated color temperature (CCT): For a light source, the color of light emitted by the light source is considered to be the same as the color of light radiated by a blackbody at a certain temperature, and the temperature of the blackbody at this time is called the color temperature of the light source. This introduces the concept of CCT. CCT mainly refers to the temperature of the most similar color blackbody radiator with the same brightness stimulus. For example: the sun is white and a bit blue at noon, when the temperature is the highest. As time changes, it feels like the temperature of the sun changes from blue to white to yellow to red.

Color Constancy

Color Constancy refers to the ability to distinguish the intrinsic color of an object from a light source. Among them, the intrinsic color of an object is determined by the reflective properties of the surface of the object, and the color of an object under white light is usually regarded as its intrinsic color. Human beings have gradually obtained this ability in the course of evolution, and are able to distinguish the intrinsic color of objects under different light sources to a certain extent. A similar feature is available in cameras, called Auto White Balance (AWB).

Image Signal Processing

After the external light signal reaches the imaging sensor (Sensor) through the lens group (Lens), the sensor generates the original image in RAW format, which is often referred to as Bayer image in the field, and the original image in RAW format needs to go through a series of Image Signal Processing (ISP) to obtain the image visible to the human eye in the usual sense, such as an image in RGB format and an image in YUV format. The image signal processing process can include modules such as Demosaic, Gamma, and Auto White Balance (AWB).

White Balance

Auto White Balance (AWB): In order to achieve color constancy of the equipment, it is necessary to introduce the concept of white balance (WB) to the imaging system. White balance is the process of restoring the "white" in the scene to "white" in the imaging system, that is, the gray blocks (white blocks, gray blocks and other neutral color blocks) in the image reach the state of R=G=B. The white balance in this state is equivalent to the CCT process in the perceived environment, and the effect of the color matrix under this CCT restores the color of various surfaces in the environment to be equivalent to the color constancy perceived by humans. At this time, the resulting image obtained through the imaging system is close to the constancy of human eye perception. In this state, the atmosphere can be adjusted according to the preferences of people in different areas to achieve various atmosphere colors. There are various white balance algorithms. The current white balance algorithms mainly include: maximum brightness method (Bright Surface First), gray world method (Gray World), improved gray world method, color gamut limit method, light source prediction method, etc. The sensor data of the scene is used to calculate the gain values of the R, G, and B channels of the AWB and the CCT value of the current scene.

Unlike on land, underwater is a relatively special scene where the R-channel will be relatively low and the color temperature very high, far beyond the range of common light sources. The main reasons may be as follows:

(1) When a photon enters water, the electrons of the water molecule absorb energy to make an electron jump and start at the minimum energy required to excite the jump;

(2) According to the photon energy formula, the energy close to the red spectrum is lower and more easily absorbed by water molecules;

(3) The human eye is less able to perceive violet light, so the sea water looks blue $$E = h\upsilon = hc/\lambda$$

where E is the photon energy, and h is Planck's constant.

Due to the different water quality, the underwater scene is presented differently, but it is usually affected by this phenomenon. In related technology, underwater shooting are carrying red or purple filters to balance the values of the three RGB channels. Triggered from the point of view of intelligence and portability, there is an urgent need for a method that can automatically recognize the underwater shooting scene and adjust the corresponding imaging strategy, and for this reason, among other reasons, the present disclosure is filed.

The technical solutions of the present disclosure will be clearly and completely described below in conjunction with the accompanying drawings of the embodiments of the present disclosure.

Referring to FIG. 1, an imaging method 100 for a wading scene is first provided according to embodiments of the present disclosure, comprising:

- S102: obtaining an original image of a current shooting scene;
- S104: using color temperature data to identify whether the current shooting scene is an underwater scene, wherein the color temperature data is obtained by a color temperature sensor for the current shooting scene;
- S106: performing a white balance process on the original image according to the identification result to obtain a processed image of the current shooting scene.

In S102, the original image can be an original image obtained based on the current shooting scene without image signal processing (ISP), such as RAW format images. As described above, the original image needs to be processed by the image signal processing to form an image visible to the human eye in the usual sense, and a white balance process is a processing module that is greatly affected by underwater shooting scenes in the image signal processing process. For this reason, the present disclosure in S104 is to identify whether the current shooting scene is an underwater scene, and based on the identification results to carry out targeted white balance process in S106 to obtain the processed image. When carrying out the white balance process, methods of the white balance process known in the field can be taken, including but not limited to, the maximum luminance method, the grayscale world method, the improved grayscale world method, color gamut boundary method, light source prediction method, and other white balance algorithms.

In this embodiment and the related description of any of the following embodiments, an underwater scene may refer to a scene in which the lens of the imaging device is at least partially under water, the lens of the imaging device is at least partially covered by water droplets, water mist, etc., or any other scene that may result in the light entering the imaging sensor of the imaging device being affected by water molecules, and it is not necessarily required that the lens of the imaging device is under water in the usual sense of the term, and at the same time, it is not necessarily require the lens of the imaging device to be completely covered by water molecules (there can be both an overwater scene and an underwater scene).

Further, it is to be noted that the processed image obtained in S106 refers to the processed image after the white balance process, and in the actual disclosure process, the technicians in the field can also carry out other processing in the image signal processing process as described above after obtaining the processed image, in order to ultimately output the image presented to the user, and the original image can also be processed before carrying out the white balance process, and no specific limitation is made in this regard.

In S104, the color temperature data is used to automatically identify whether the current shooting scene is an underwater scene. As described above, the color temperature sensor is capable of sensing the spectral energy of different wavelengths, and the energy close to the red spectrum is lower, and the photon energy is more easily absorbed by the water molecules, which will lead to differences in the color temperature data obtained for the underwater scene and that in the conventional shooting scene (e.g. differences in the energy values of certain channels, or differences in the ratio of energy values in each channel), so that the color temperature data can be used to identify whether the current shooting scene is an underwater scene. Based on such a principle, the person skilled in the art may choose any suitable method to analyze the color temperature data to identify whether the current shooting scene is an underwater shooting scene, for example, comparing the energy of the various wave channels in the color temperature data with the energy of the various wave channels in a conventional shooting scene (e.g., in an overwater shooting scene), or comparing the energy of the various channels in the color temperature data with the energy of the various channels in the underwater scene/overwater scene. For example, the color temperature data can be analyzed using a trained scene classification model to complete the identification.

In some embodiments, using the color temperature data to identify whether the current shooting scene is an underwater scene may specifically include: inputting the color temperature data into a scene classification model, and the scene classification model determining a confidence level that the current shooting scene is an underwater scene.

The scene classification model may be a pre-trained machine learning or deep learning model, such as a vector machine model, and a person skilled in the art may select suitable training material to train the model, and then obtain the scene classification model. In this embodiment, the scene classification model may output a confidence level that the current shooting scene is an underwater scene based on the input color temperature data. Confidence, also known as reliability, or confidence level, confidence coefficient, in statistical theory, when sampling to estimate population parameters, the conclusion is always uncertain due to the randomness of the samples. Therefore, a method of stating a probability, also known as interval estimation in mathematical statistics, is used, i.e., how large is the corresponding probability that the estimate is within a certain permissible margin of error from the overall parameter, and this corresponding probability is referred to as the confidence level. In the present embodiment, the confidence level can be understood as a degree of confidence in recognizing the current shooting scene as an underwater scene, and in some embodiments, the confidence level can also reflect, to a certain extent, whether both an overwater scene and an underwater scene are present in the current shooting scene, or even further reflect the proportion of the overwater scene and the underwater scene in the current shooting scene. In some embodiments, the confidence level is further applied in the white balance process, as described in the relevant portions below. In some other embodiments, the scene classification model may directly output a yes or no judgment.

In some embodiments, the validity of the color temperature data needs to be determined before inputting the color temperature data into the scene classification model to ensure the accuracy of the identification results.

In some embodiments, the validity of the color temperature data may be determined by comparing the color temperature data with a preset color temperature range, and when the color temperature data is within the preset color temperature range, the color temperature data is determined to be valid. The preset color temperature range may be set by a person skilled in the art, for example, the color temperature range may be set based on an effective measurement range of the color temperature sensor used, or, the color temperature range value may be set based on an empirical value or a historical data value.

In some embodiments, the validity of the color temperature data may be determined by calculating a difference between a point in time at which the color temperature data is collected by the color temperature sensor and a point in time at which the color temperature data collected by the color temperature sensor is obtained, and when the difference is less than or equal to the predetermined threshold, the color temperature data is determined to be valid. Specifically, there is a certain time difference when the data is collected by the color temperature sensor and when the data is obtained (e.g., obtained by the processor), and if the time difference is too large, there may be a risk that the current shooting scene has changed when the color temperature data is obtained, and thus, data with a time difference greater than the preset threshold needs to be excluded to ensure that the identification result can correspond to the current shooting scene. The threshold may be set according to actual needs, and no specific limitation is made thereon.

In some embodiments, before inputting the color temperature data into the scene classification model, the color temperature data may be subjected to a filtering process to reject abnormal color temperature data points. The filtering of the color temperature data may be performed using a filter commonly used in the art, such as a FIR filter, which may be selected by the person skilled in the art according to the actual need.

It is to be noted that the above-described method of determining the validity of the color temperature data and the method of rejecting anomalous color temperature data points may be used individually or in combination, and there is no specific limitation thereto.

In some embodiments, since the color temperature data collected by the color temperature sensor is affected by the actual scene brightness, the color temperature data may be normalized before it is input into the scene classification model in order to ensure the stability of the scene classification model. The normalization process may be to use the value of the green band channel or the full band channel in the color temperature data as a reference value to normalize the values of all channels in the color temperature data. Specifically, with F_ref denoting the base value and Fn denoting the value of each channel, the value F_norm=Fn/F_ref after the normalization process. In one embodiment, the normalization process may be carried out after verifying the validity of the color temperature data in order to improve the processing efficiency and further ensure the accuracy of the color temperature data.

Figure 2:
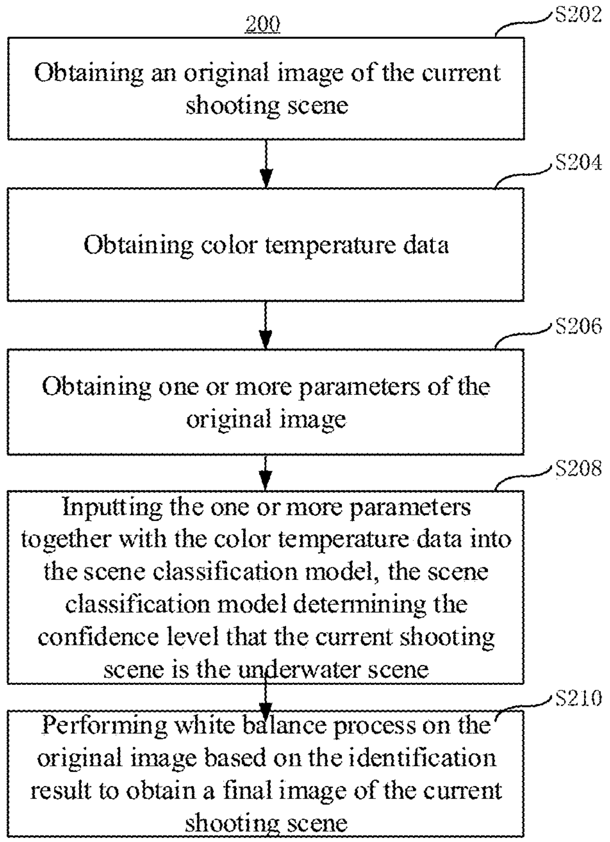
FIG. 2 shows a flowchart of a method of imaging a wading scene according to yet another embodiment of the present disclosure.

In some embodiments, referring to FIG. 2, there is provided yet another method 200 of imaging a wading scene, comprising:

S202: Obtaining an original image of the current shooting scene;

S204: Obtaining color temperature data, wherein the color temperature data is obtained by the color temperature sensor for the current shooting scene;

S206: Obtaining one or more parameters of the original image, the one or more parameters including at least one of an underwater area percentage, an overwater area percentage, a color temperature value, or a luminance value;

S208: Use the color temperature data and the one or more parameters together to identify whether the current shooting scene is an underwater scene;

S210: Perform a white balance process on the original image according to the identification result to obtain a processed image of the current shooting scene.

In this embodiment, in addition to using the color temperature data collected by the color temperature sensor to make the judgment, parameters of the original image are also used to make the judgment, and these parameters may include at least one of an underwater area percentage, an overwater area percentage, a color temperature value, or a brightness value. In some embodiments, when the color temperature data and the one or more parameters are used to jointly identify whether the current scene is an underwater scene, the color temperature data and the one or more parameters may be jointly input into the scene classification model, and the scene classification model may then determine a confidence level that the current shooting scene is an underwater scene. In some embodiments, the identification may also be performed by other methods, such as comparing the one or more parameters with a predetermined range to obtain the identification result, etc.

The underwater area percentage and the overwater area percentage can directly reflect whether there is an underwater area in the original image and whether there is also an overwater area at the same time, and can specifically reflect the respective percentage of the underwater area and the overwater area, thus providing a basis for recognizing whether the current shooting scene is an underwater scene.

The color temperature and luminance values can indirectly reflect whether the original image was shot in an underwater scene (as described above, the energy of light passing through water molecules changes, resulting in differences in the color temperature and luminance values of the image shot in an underwater scene and the scene above water), and can be used to determine the range of the color temperature and luminance value of a general underwater scene by statistically analyzing a number of underwater scene clips. When the color temperature value or luminance value falls into this interval, it can be considered that the original image has a high possibility of being shot in the underwater scene. Identifying the underwater scene based on these parameters of the original image together with the color temperature data can further ensure the accuracy of the identification.

It should be particularly noted that unlike the color temperature data obtained by the color temperature sensor, the color temperature value in this embodiment and other embodiments described below is obtained directly by analyzing the original image, for example, by using the pixel values of the original image to calculate the value, and does not need to be obtained with the aid of the color temperature sensor.

In this embodiment, a person skilled in the art may optionally select one or more of the above parameters to determine, in conjunction with the color temperature data, a confidence level that the current scene is an underwater scene.

In some embodiments, an underwater area in the original image may be determined by a preset underwater scene RGB range value, and thus the underwater area percentage may be determined based on the area of the underwater region. The preset underwater scene RGB range value may be obtained by calibrating the underwater scene material, for example, the underwater scene material may include underwater scene images containing gray cards taken at different depths and different distances, and the RGB values of these scenes may be statistically analyzed to obtain the underwater scene RGB range value. When the RGB value of an area in the original image falls into the RGB range value of the underwater scene, the area is considered to be an underwater area, and then the underwater area in the original image can be statistically analyzed and the underwater area percentage can be calculated. In the actual disclosure process, the original image can first be divided into a plurality of image blocks, and the RGB values in the plurality of image blocks can be counted, and when the RGB values in a certain image block fall into the RGB range values of the underwater scene, the image block is considered to be an underwater area, and all image blocks in the original image are traversed, and the areas of all the image blocks determined to be an underwater area are summed up, so as to calculate the underwater area percentage.

Similarly to the underwater area percentage, the overwater area percentage may also be determined by a preset overwater scene RGB range value, which may be obtained by calibrating the overwater scene material, and will not be described herein.

In some embodiments, the underwater scene footage as well as the overwater scene footage may also be used to train a machine learning or deep learning model, which in turn recognizes (e.g., by feature extraction) the underwater areas and the overwater areas in the original image, which in turn calculates the underwater area percentage and the overwater area percentage. The person skilled in the art may also recognize the underwater area and the overwater area in other suitable ways.

In some embodiments, the one or more parameters may also include an energy percentage of the different wavebands, and the energy percentage of the different wavebands may be determined based on color temperature data. As described above, when photons enter water, the energy of different wavebands of the photons is affected by the energy of the water molecules, which will result in a change in the energy ratio between the different wavebands compared to that of the overwater scene. Accordingly, the underwater scene can be recognized as such based on the energy ratio of the different wavebands.

In the above embodiment, in determining a confidence level that the current shooting scene is an underwater scene, it may specifically include: determining a first confidence level that the current shooting scene is an underwater scene based on the color temperature data; determining a second confidence level that the current shooting scene is an underwater scene based on the one or more parameters; and determining a confidence level that the current shooting scene is an underwater scene based on the first and the second confidence levels by the scene classification model.

When determining the first confidence level that the current shooting scene is an underwater scene based on the color temperature data, reference may be made to the relevant portion of the method 100 that uses a scene classification model to determine the confidence level that the current shooting scene is an underwater scene, which will not be repeated herein.

In this embodiment, in addition to using the color temperature data to determine the first confidence level, a second confidence level is further determined based on one or more parameters, and then the scene classification model ultimately determines the confidence level that the current shooting scene is an underwater scene based on the first confidence level and the second confidence level. For example, the first confidence level and the second confidence level may be averaged to determine the final confidence level, or the first confidence level may be adjusted according to the value of the second confidence level to determine the final confidence level. A person skilled in the art may make the selection according to the actual situation.

In some embodiments, in determining a second confidence level that the current shooting scene is an underwater scene based on the one or more parameters, it may specifically include:

weights corresponding to the one or more parameters are determined based on values of the one or more parameters, wherein the values of the different parameters have different correspondences with the weights, and then, a second confidence level is determined based on the weights corresponding to the one or more parameters.

Figure 3:
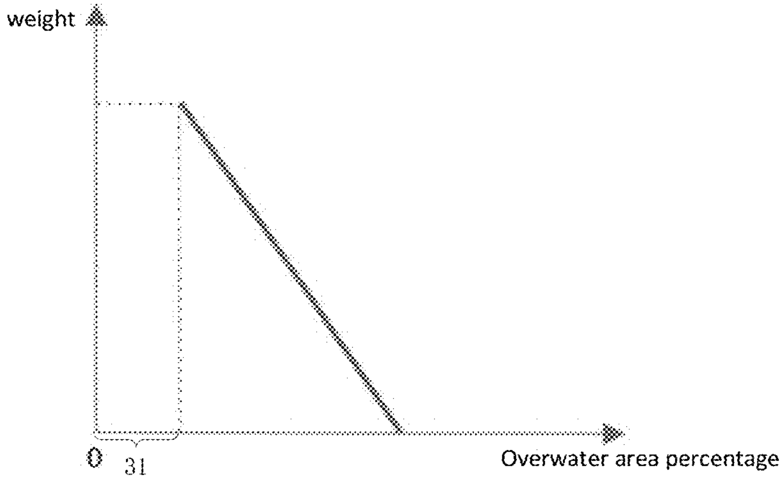
FIG. 3 shows a schematic diagram of correspondence between underwater area percentage and weights according to an embodiment of the present disclosure.
Figure 4:
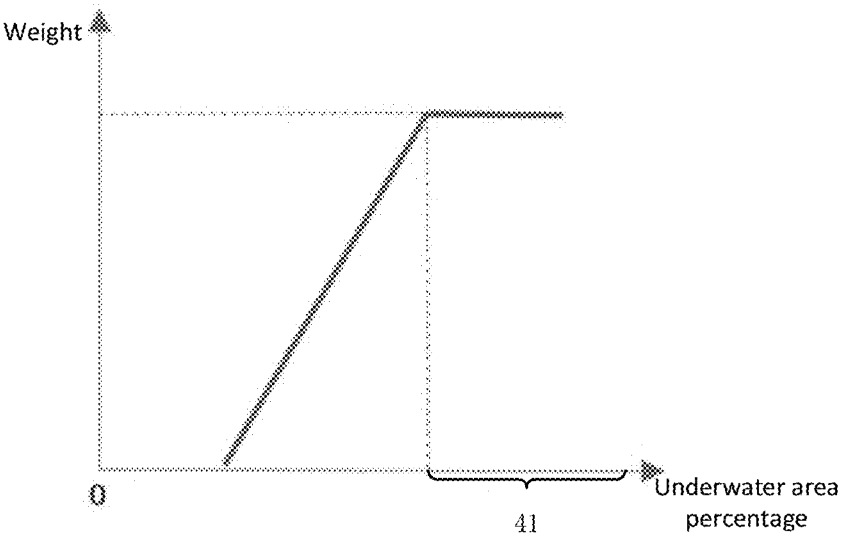
FIG. 4 shows a schematic diagram of correspondence between overwater area percentage and weights according to an embodiment of the present disclosure.
Figure 5:
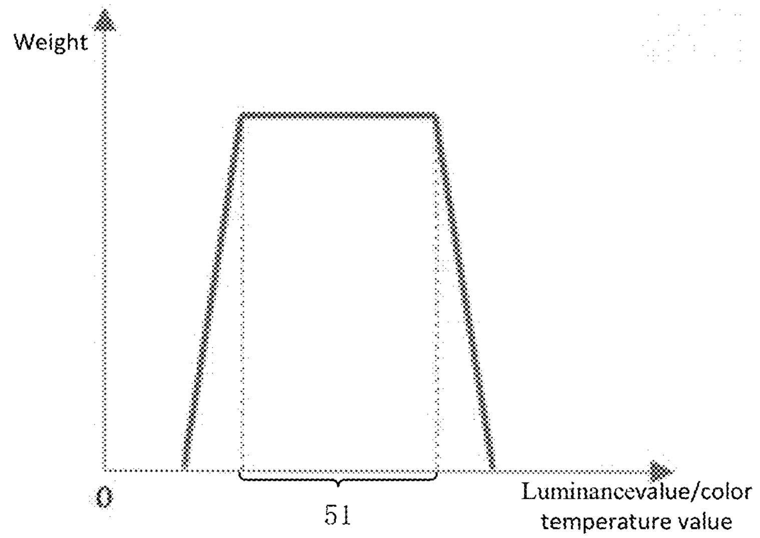
FIG. 5 shows a schematic diagram of correspondence between color temperature value or luminance value and weights according to an embodiment of the present disclosure.

A schematic representation of the correspondence between some of the parameters and the weights is illustrated in FIGS. 3-5.

FIG. 3 illustrates the correspondence between the overwater area percentage and the weight, where the horizontal axis is the overwater area percentage and the vertical axis is the corresponding weight. When the overwater area percentage is high, the corresponding weight may tend to be 0. In a certain range, the overwater area percentage may show an inverse proportional relationship with the weight. When the overwater area percentage is lower than a certain threshold, for example, when the percentage is located in the interval 31 shown in FIG. 3, the corresponding weight may no longer increase. The specific proportion coefficient between the overwater area percentage and the weight as well as the corresponding threshold may be set by the person skilled in the art, for example, based on an empirical value or based on the data of the overwater area percentage in the overwater scene material described above.

FIG. 4 illustrates a correspondence between the underwater area percentage and the weight, wherein the horizontal axis is the underwater area percentage and the vertical axis is the weight. When the underwater area percentage is low, the corresponding weight may tend to be 0. Within a certain range, the underwater area percentage may be positively proportional to the weight, and when the underwater area percentage is higher than a certain threshold, for example, when the underwater area percentage is located in the interval 41 illustrated in FIG. 4, the corresponding weight may no longer increase.

FIG. 5 illustrates the correspondence between the luminance values or color temperature values and the weights, and when the luminance values or color temperature values are in a predetermined range value interval 51, they can have high weights, and when the luminance values and color temperature values fall near the borders on both sides of the range value interval 51, the corresponding weights can be lowered as the luminance value or color temperature value gradually moves away from the range value interval 51. The predetermined range value interval 51 can be determined by statistical analysis of some underwater scene material (such as the underwater scene material described above), and the range value interval 51 can characterize a range of color temperature values and luminance values in a general underwater scene, such that when the color temperature value or luminance value of the original image falls in the range value interval 51, it is considered to have a high likelihood of existence of an underwater scene.

Similar to the color temperature value and the luminance value, the energy ratio of different wave bands can be assigned corresponding weights according to a predetermined range value interval, and the energy ratio of each wave band can be obtained with the help of the color temperature sensor while obtaining the underwater scene material described above, so that the data can be statistically analyzed to determine the range value interval.

Figure 6:
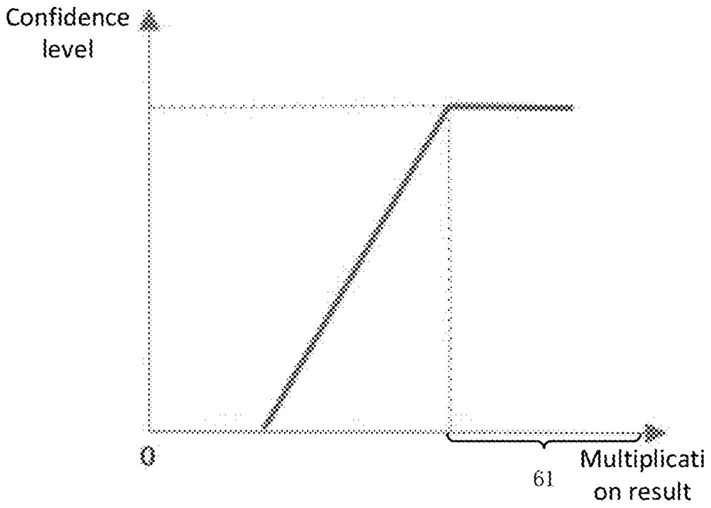
FIG. 6 shows a schematic diagram of correspondence between cumulative multiplication result and confidence level according to an embodiment of the present disclosure.

Further, after determining the weights corresponding to the one or more parameters described above, the weights may be multiplied cumulatively, and the second confidence level may be calculated based on the result of the cumulative multiplication. The relationship between the result of the cumulative multiplication of the weights and the second confidence level may be referred to FIG. 6, wherein the horizontal axis is the result of the cumulative multiplication and the vertical axis is the confidence level. When the result of the cumulative multiplication tends to be 0, the corresponding confidence level tends to 0. As the cumulative multiplication result rises, the second confidence level rises gradually. In some embodiments, when the multiplication result exceeds a certain threshold, for example, when the multiplication result is located in the interval 61 illustrated in FIG. 6, the second confidence level reaches the threshold, thereby limiting the second confidence level brought about by the multiplication result, so as to avoid that, when determining the final confidence level based on the first confidence level and the second confidence level, the value of the second confidence level is too high, which results in the finalized confidence level being biased toward the second confidence level determined by using the above-described one or more parameters.

In some embodiments, the energy ratios of the different bands may not be used to directly calculate the second confidence level, but instead be used to adjust the second confidence level after calculating the second confidence level by other parameters. Specifically, the second confidence level is adjusted downward if the energy ratio of the near-infrared band and/or the red band is relatively high, and the second confidence level is adjusted upward when the energy ratio of the blue-violet band is relatively high. In such embodiments, since there is no need to calculate the weights of the energy ratio of the different bands, there may be no need to determine a range value interval for the energy ratio of the different bands. In some embodiments, the energy ratios of the different wavebands may also be used to perform the adjustment of the first confidence level in a manner similar to the adjustment of the second confidence level described above.

In some embodiments, there may be continuous shooting scenarios, such as shooting video or continuous shooting of multiple frames, at which time the confidence level that the shooting scene of each frame is an underwater scene can be calculated. Due to the fact that in such a scenario, the change of the shooting scene has a certain degree of continuity, the confidence level of the shooting scene can be filtered in a time domain according to the confidence level of the shooting scene that is adjacent to the current frame, so as to further maintain the stability of scene identification, avoid jumping of the color of the frame, and reduce the misjudgment of an overwater scene as an underwater scene. The time domain filtering can be performed in a manner known in the art and will not be repeated here.

As described above, after the confidence level is determined, it can be further adjusted using that confidence level in the white balance process. A method for white balancing an image according to the confidence level is described in detail below.

In some embodiments, a first white balance gain is obtained for the original image captured of the current scene based on the white balance process of the overwater scene; a second white balance gain is obtained for the original image captured of the current shooting scene based on the white balance process of the underwater scene, and then the first white balance gain and the second white balance gain are fused to obtain a third white balance gain for the final white balance process of the original image of the current shooting scene. Thereby, a processed image of the current shooting scene is obtained, wherein a weight ratio of the first white balance gain and the second white balance gain at the time of fusion may be determined based on the confidence level.

As described above, there may be both overwater and underwater scenes in the current shooting scene, and at this time it may be difficult to obtain a better image process effect for the original image of the current shooting scene by purely white balance process based on the overwater scene and purely white balance process based on the underwater scene. It is understandable that the higher the ratio of underwater area in the current scene, the closer it is to a typical underwater scene, and the higher the possibility of being recognized as underwater scene, accordingly, the higher the confidence level. Thus, the confidence level can reflect the underwater area percentage to a certain extent, even though such parameters as the underwater area percentage and the overwater area percentage, which are specific statistics of the underwater area and the overwater area, are not applied in the process of determining the confidence level. Therefore, in this embodiment, a first white balance gain based on the processing of an overwater scene and a second white balance gain based on the processing of an underwater scene are respectively obtained when processing the original image, and then the first white balance gain and the second white balance gain are fused to obtain a third white balance gain suitable for processing the original image, and then the original image is processed based on the third white balance gain to obtain a processed image of the current shoot scene. According to the confidence level, the first white balance gain and the second white balance gain are fused to obtain a third white balance gain. The processed image of the current shooting scene is obtained, wherein the first white balance gain and the second white balance gain are fused according to a confidence level to determine a weight ratio. It can be understood that since the third white balance gain takes into account the first white balance gain based on the processing of the overwater scene and the second white balance gain based on the processing of the underwater scene, the white balance process of the original image of the current shooting scene based on the third white balance gain can take into account the processing effect when there are both the overwater area and the underwater area in the scene.

Both the overwater scene white balance process and the underwater scene white balance process may use white balance algorithms such as the maximum brightness method, the gray world method, the improved gray world method, the color gamut boundary method, the light source prediction method, etc., which are well known in the art, and the same algorithm may be used for the overwater scene white balance process and the underwater scene white balance process, and different parameters may be set by a skilled person skilled in the art according to the specific imaging characteristics of the overwater scene and the underwater scene, respectively, so as to make different degrees of adjustment for the overwater scene and the underwater scene. In some embodiments, the white balance process for the overwater scene and the white balance process for the underwater scene may also use different white balance algorithms.

In the specific implementation process, if the confidence level is higher, the proportion of the second white balance gain at the time of fusion can be higher, and the people in the field can determine the specific confidence level and fusion ratio correspondence according to the actual needs, and there is no specific limitation in this regard. At the same time, the algorithm used in the fusion of the first white balance gain and the second white balance gain can be a fusion algorithm known in the field, and is not further elaborated herein.

In performing the white balance process of the underwater scene, a preferred method is to first count the gray blocks in the underwater area, and the method of determining this underwater area can be referred to the method used in determining the proportion of the underwater area as described above, and will not be repeated herein. Afterwards, these gray blocks can be statistically analyzed to determine the gain value of each channel in the white balance process of the underwater scene.

In some embodiments, when the gray blocks in each underwater area are statistically analyzed, these gray blocks may also be given different weights according to the color temperature values in each underwater area, and the weights may be higher for the gray blocks in the underwater area with a lower color temperature. The main reason is that, in the actual shooting process, the farther away from the imaging device, the farther the light reaches the camera through the journey, the more the spectrum near the red is absorbed, the higher the color temperature. For underwater scene white balance process, the main expectation is to estimate the color temperature of the foreground target, and the lower the color temperature of the region belongs to the foreground, the higher the probability, so for these regions in the gray block to give a higher weight.

In some embodiments, in order to mitigate the interference of noise, in the underwater white balance process, the statistical information of the individual gray blocks may be first filtered in the connectivity domain, and the gain value may be obtained after the statistical analysis.

In some embodiments, before fusing the first white balance gain and the second white balance gain to obtain a third white balance gain suitable for the current shooting scene, white balance correction may be performed on the first white balance gain and/or the second white balance gain. Since the human eye is still able to feel the ambient color of the environment underwater, and common underwater scenes will have a blue or blue-green color. Similarly, the human eye has a certain tendency for the color in the overwater scene, therefore, white balance correction of the first white balance gain and the second white balance gain can further enhance the visual effect of the image.

In some embodiments, the coefficient for white balance correction may be determined based on at least one of a color temperature value, a luminance value, or a hue value of the original image. The person skilled in the art may determine the coefficient for white balance correction by interpolating coefficients and looking up tables, and may determine the coefficients for white balance correction for the first white balance gain and the second white balance gain based on the table of coefficients corresponding to the overwater scene and the table of coefficients corresponding to the underwater scene, respectively. The coefficient table between the specific parameter values and the coefficients of the white balance correction may be set by a person skilled in the art according to the empirical values and the specific imaging needs, and no specific limitation is made herein.

In some embodiments, in addition to determining the fusion ratio based on the confidence level, the fusion ratio may also be determined based on one or more of the parameters described above, such as the color temperature value, the luminance value, the overwater area percentage, the underwater area percentage, and so on, and it can be appreciated that all of these parameters are capable of reflecting to a certain extent the ratio between the underwater area and the overwater area in the scene (in some embodiments, the process of obtaining the confidence level actually also uses one or more of these parameters), and thus the principle of determining the fusion ratio based on these parameters is similar to the principle of determining the fusion ratio based on the confidence level, and will not be repeated herein.

In some embodiments, as described above, there exists a continuous shooting scene, and due to the large difference in color temperature between the overwater scene and the underwater scene, if a change (e.g., a change in occupancy ratio) of the overwater scene and the underwater scene is detected in the course of the shooting process, a jump in color may occur, which affects the visual effect. For this reason, the confidence level of the underwater scene from the previous frame of the shooting scene that is temporally adjacent to the current frame of the shooting scene can be determined; based on the difference between the confidence level of the previous frame of the shooting scene and the confidence level of the current frame of the shooting scene, filtering on the processed image is performed to adjust the convergence speed of the white balance.

The convergence speed of the white balance can reflect, to a certain extent, the difference in white balances between the current frame image and the previous frame image, and when the scene changes suddenly, the convergence speed of the white balance can be increased to quickly adapt to the change in color temperature brought about by the change in the scene. While the scene is more stable, the convergence speed of the white balance can be lowered to ensure that the color of the image is stable and to avoid color jumps. Specifically, in some embodiments, when the confidence level of the last frame of the shooting scene is greater than the confidence level of the current frame of the shooting scene, it means that the shooting may be shifted from underwater to overwater during this period, and the convergence speed of the white balance can be improved by filtering control to avoid the problem of reddish color; when the confidence level of the last frame of the shooting scene is less than the confidence level of the current frame of the shooting scene, it means that the shooting scene may be underwater or underwater all the time, or transferred from overwater to underwater. Filtering control may be used to reduce the convergence speed of the white balance. In some embodiments, an adjustment ratio for the speed of white balance convergence may be determined specifically based on the difference in confidence levels.

In some embodiments, in addition to white balance process based on the identification results of the underwater scene, other adjustments of the shooting parameters and/or image processing may be performed, for example, the adjustment of the exposure parameters may be performed based on the identification results, and the specific adjustment method may be referred to the relevant techniques known in the art, and will not be repeated herein.

Figure 7:
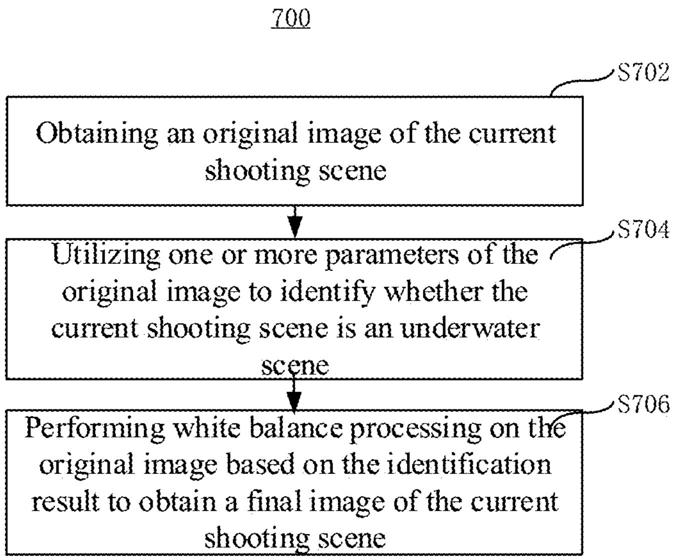
FIG. 7 shows a flowchart of a method of imaging a wading scene according to a further embodiment of the present disclosure.

Some embodiments according to the present disclosure also provide a method 700 for imaging a wading scene, referring to FIG. 7, comprising:

- S702: obtaining an original image of the current shooting scene;
- S704: one or more parameters of the original image are utilized to identify whether the current shooting scene is an underwater scene, wherein the one or more parameters include at least one of an underwater area percentage, an overwater area percentage, a color temperature value, or a luminance value;
- S706: performing white balance process on the original image according to the identification result to obtain a processed image of the current shooting scene.

Unlike the method 100 and method 200 described above, the method 700 of the present embodiment no longer uses the color temperature data collected by the color temperature sensor for the identification of the underwater scene, but directly uses one or more parameters obtained from the original image for the identification. Such a method can save a certain cost while realizing automatic identification of the underwater scene.

The specific method used in method 700 for identifying whether the current shooting scene is an underwater scene using the one or more parameters may be the method used in determining a second confidence level that the current scene is an underwater scene using the one or more parameters as described in method 200, which will not be repeated herein.

Identifying whether the current shooting scene is an underwater scene using the one or more parameters includes: inputting the one or more parameters into a scene classification model, and the scene classification model determining a confidence level that the current shooting scene is an underwater scene.

In some embodiments, the underwater area percentage and the overwater area percentage are determined based on the predetermined underwater scene RGB range and the predetermined overwater scene RGB range, respectively.

In some embodiments, the one or more parameters further comprise a percentage of energy in different bands, the percentage of energy in different bands being captured by a color temperature sensor.

In some embodiments, the one or more parameters are input into the scene classification model, and the scene classification model determines a confidence level that the current shooting scene is an underwater scene comprising: determining weights corresponding to the one or more parameters based on the values of the one or more parameters, wherein the values of the different parameters have different correspondences with the weights; and determining a confidence level that the underwater scene is an underwater scene based on the weights corresponding to the one or more parameters.

In some embodiments, determining a confidence level for the underwater scene based on the weights corresponding to the one or more parameters comprises: cumulatively multiplying the weights corresponding to the one or more parameters; and determining a confidence level for the underwater scene based on the cumulative multiplication result.

In some embodiments, determining a confidence level of the underwater scene based on the weights corresponding to the one or more parameters further comprises: adjusting the confidence level of the underwater scene based on the energy percentage of different bands; adjusting the confidence level of the underwater scene downwardly when the percentage of the energy of the near-infrared band and/or the red band is relatively high; and adjusting the confidence level of the underwater scene upwardly when the percentage of the energy of the blue-violet band is relatively high.

In some embodiments, a time domain filtering process is performed on the confidence level that the current shooting scene is an underwater scene based on the confidence level that the previous frame or frames of the shooting scene that are temporally adjacent to the current frame of the captured scene are underwater.

Similarly, the specific method used for white balance process of the original image based on the identification results can be referred to as described in the relevant portion above and will not be repeated herein.

In some embodiments, performing a white balance process on the original image based on the identification results comprises: obtaining a first white balance gain based on the white balance process of an overwater scene for the original image captured of the current shooting scene; obtaining a second white balance gain based on the white balance process of an underwater scene for the original image captured of the current shooting scene; fusing the first white balance gain and the second white balance gain to obtain a third white balance gain, wherein a weight ratio of the first white balance gain and the second white balance gain in the fusion is determined based on a confidence level; and the white balance process is performed on the original image of the current shooting scene based on the third white balance gain to obtain a processed image of the current shooting scene.

In some embodiments, performing a white balance process on the original image based on the identification result further comprises: performing white balance correction of the first white balance gain and/or the second white balance gain before fusing the first white balance gain and the second white balance gain to obtain a third white balance gain.

In some embodiments, a color temperature value, a luminance value, and a hue value of the original image are obtained, and a coefficient for white balance correction is determined based on the color temperature value, the luminance value, and the hue value.

In some embodiments, a confidence level of an underwater scene of a previous frame of the shooting scene that is temporally adjacent to the current frame of the shooting scene is determined; based on the difference between the confidence level of the previous frame of the shooting scene and the confidence level of the current frame of the shooting scene, a filtering process is performed on the processed image to adjust the convergence speed of the white balance process.

In some embodiments, when the confidence level of the scene captured in the previous frame is greater than the confidence level of the scene captured in the current frame, filtering is performed on the processed image to increase the convergence speed of the white balance process; when the confidence level of the scene captured in the previous frame is less than the confidence level of the scene captured in the current frame, filtering is performed on the processed image to decrease the convergence speed of the white balance process.

In some embodiments, the method 700 may further include adjusting an exposure parameter for the original image based on the identification result.

Figure 8:
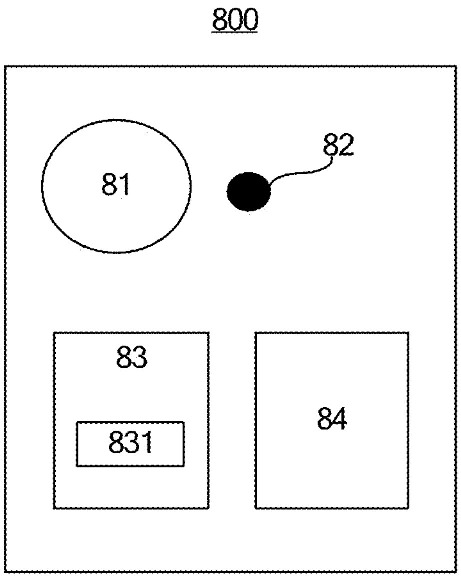
FIG. 8 shows a schematic diagram of an imaging device according to an embodiment of the present disclosure.

According to some embodiments of the present disclosure, there is also provided an imaging device 800, referring to FIG. 8, the imaging device 800 may comprise: an imaging sensor 81, which is used to obtain an original image of the current shooting scene, a color temperature sensor 82, which is used to collect color temperature data of the current shooting scene, an processor 84, a memory 83, which stores a computer program 831 that is available to be executed by the processor 84, the processor 84 realizes the following steps when executing the computer program 831: using the color temperature data to identify whether the current shooting scene is an underwater scene, and performing a white balance process on the original image according to the identification result to obtain a processed image of the current shooting scene.

The imaging sensor 800 may include, but is not limited to, CCD, CMOS, and other sensors well known in the art. The processor 84 may comprise one or more processors, and the processor 84 may comprise processors dedicated to image processing (e.g., white balance processing) as well as processors for other data processing, which may be integrated on the same chip or on different chips, and a person in the art may select a suitable architecture of the processor 84 to realize the functions of the present embodiment as well as the related ones below. Memory 83 may include, but is not limited to: phase-change random access memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disk (DVD) or other optical memory, cassette, tape or disk memory or other magnetic storage device, cache, registers, or any other non-transfer medium that can be used to store computer programs capable of being executed by the processor 84. The specific technical details involved in the execution of the computer program 831 by the processor 84 in order to realize the above steps can be referred to in the description of the relevant portion of the above text and will not be repeated herein.

In some embodiments, identifying whether the current shooting scene is an underwater scene using the one or more parameters comprises: inputting color temperature data into a scene classification model, and the scene classification model determining a confidence level that the current shooting scene is an underwater scene.

In some embodiments, determining the validity of the color temperature data before inputting the color temperature data into the scene classification model is specifically used to: compare the color temperature data with a predetermined color temperature range, and determine that the color temperature data is valid when the color temperature data is within the predetermined color temperature range.

In some embodiments, determining the validity of the color temperature data before inputting the color temperature data into the scene classification model comprises: calculating a difference between a point in time at which the color temperature data is collected by the color temperature sensor 82 and a point in time at which the color temperature data collected by the color temperature sensor 82 is obtained, and determining that the color temperature data is valid when the difference is less than or equal to the predetermined threshold value.

In some embodiments, before inputting the color temperature data into the scene classification model, the color temperature data is subjected to a filtering process to reject abnormal color temperature data points.

In some embodiments, before inputting the color temperature data into the scene classification model, the values of all channels in the color temperature data are normalized using the value of the green band channel or the full band channel in the color temperature data as a base value.

In some embodiments, identifying whether the current shooting scene is an underwater scene further comprises: obtaining one or more parameters of the original image, the one or more parameters comprising at least one of an underwater area percentage, an overwater area percentage, a color temperature value, and a luminance value; inputting the one or more parameters together with the color temperature data into the scene classification model, and the scene classification model determining a confidence level that the current shooting scene is an underwater scene.

In some embodiments, the underwater area percentage and the overwater area percentage are determined based on the predetermined underwater scene RGB range and the predetermined overwater scene RGB range, respectively.

In some embodiments, the one or more parameters further comprise a percentage of energy in different bands, the percentage of energy in different bands being determined based on color temperature data.

In some embodiments, the one or more parameters and the color temperature data are jointly input into the scene classification model, and the scene classification model determines a confidence level that the current shooting scene is an underwater scene including: determining a first confidence level that the current shooting scene is an underwater scene based on the color temperature data; determining a second confidence level that the current shooting scene is an underwater scene based on the one or more parameters; and determining a confidence level that the current shooting scene is an underwater scene based on the first and the second confidence levels of the scene classification model.

In some embodiments, determining a second confidence level that the current shooting scene is an underwater scene based on the one or more parameters comprises: determining weights corresponding to the one or more parameters based on a value of the one or more parameters, wherein the values of the different parameters have different correspondences with the weights; and determining a second confidence level based on the weights corresponding to the one or more parameters.

In some embodiments, determining the second confidence level based on the weights corresponding to the one or more parameters comprises: multiplying the weights corresponding to the one or more parameters cumulatively; and determining the second confidence level based on the result of the cumulative multiplication.

In some embodiments, determining the second confidence level based on the weights corresponding to the one or more parameters further comprises: adjusting the second confidence level based on the percentage of energy in different bands; adjusting the second confidence level downward when the percentage of energy in the near-infrared band and/or the red band is relatively high; and adjusting the second confidence level upward when the percentage of energy in the blue-violet band is relatively high.

In some embodiments, determining the confidence that the current shooting scene is an underwater scene further comprises: performing a time domain filtering process on the confidence level that the current shooting scene is an underwater scene based on the confidence level that the previous frame or frames of the shooting scene adjacent to the current frame of the shooting scene in time are underwater scenes.

In some embodiments, performing a white balance process on the original image based on the identification results includes: obtaining a first white balance gain based on an overwater scene white balance process for the original image captured of the current shooting scene; obtaining a second white balance process gain based on an underwater scene white balance process for the original image captured of the current shooting scene; fusing the first white balance gain and the second balance gain to obtain a third white balance gain, wherein a weight ratio of the first white balance gain and the second white balance gain in the fusion is determined based on a confidence level; and the white balance process is performed on the original image of the current shooting scene based on the third white balance gain to obtain a processed image of the current shooting scene.

In some embodiments, performing the white balance process on the original image based on the identification result further comprises: performing white balance correction of the first white balance gain and/or the second white balance gain before fusing the first white balance gain and the second white balance gain to obtain a third white balance gain.

In some embodiments, the processor 84, in executing the computer program 831, is further used to implement: obtaining at least one of a color temperature value, a luminance value, and a hue value of the original image, determining a coefficient for white balance correction based on the at least one of the color temperature value, the luminance value, or the hue value.

In some embodiments, performing a white balance process on the original image based on the identification results further comprises: determining a confidence level of an underwater scene of a previous frame of the shooting scene that is temporally adjacent to the current frame of the shooting scene; and filtering the processed image based on the difference between the confidence level of the previous frame of the shooting scene and the confidence level of the current frame of the shooting scene to adjust the convergence speed of the white balance process.

In some embodiments, when the confidence level of the scene captured in the previous frame is greater than the confidence level of the scene captured in the current frame, filtering is performed on the processed image to increase the convergence speed of the white balance; when the confidence level of the scene captured in the previous frame is less than the confidence level of the scene captured in the current frame, filtering is performed on the processed image to decrease the convergence speed of the white balance.

In some embodiments, white balance processing of the original image based on the identification results further comprises: adjusting exposure parameters of the original image based on the identification results.

Figure 9:
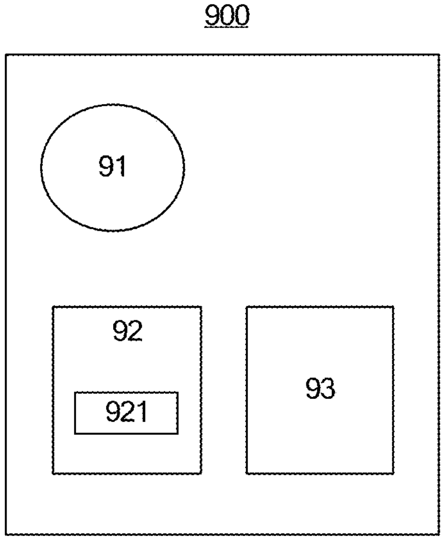
FIG. 9 shows a schematic diagram of an imaging device according to yet another embodiment of the present disclosure.
Figure 10:
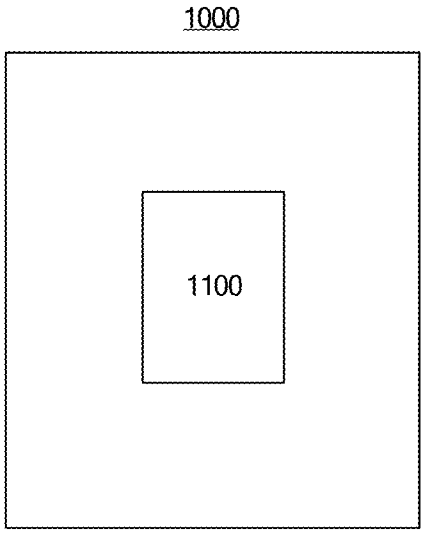
FIG. 10 shows a schematic diagram of a computer-readable storage medium according to an embodiment of the present disclosure.

According to some embodiments of the present disclosure, there is also provided an imaging device 900, which, with reference to FIG. 9, comprises: an imaging sensor 91 for obtaining an original image of the current shooting scene; an processor 93; a memory 92 storing a computer program 921 executable by the processor 93; wherein the processor 93 is used to realize the following steps in executing the computer program 921: utilizing one or more parameters of the original image to identify whether the current shooting scene is an underwater scene, wherein the one or more parameters include at least one of the underwater area percentage, the overwater area percentage, the color temperature value and the luminance value; performing white balance process on the original image based on the identification results to obtain the processed image of the current shooting scene.

The difference between the imaging device 900 and the imaging device 800 is that the imaging device 900 can realize the identification of the underwater scene directly through one or more parameters in the original image without using the color temperature sensor, and the working principle of the components in the imaging device 900 can be referred to the relevant description of the imaging device 800 above, and, the processor 93 realizes the identification of the underwater scene in executing the computer program 921 when the specific technical details of the relevant steps can also be referred to the relevant description above, and will not be repeated herein.

In some embodiments, identifying whether the current shooting scene is an underwater scene using the one or more parameters includes: inputting the one or more parameters into a scene classification model, and the scene classification model determining a confidence level that the current shooting scene is an underwater scene.

In some embodiments, the underwater area percentage and the overwater area percentage are determined based on the predetermined underwater scene RGB range and the predetermined overwater scene RGB range, respectively.

In some embodiments, the one or more parameters further comprise a percentage of energy in different bands, the percentage of energy in different bands being captured by a color temperature sensor. In such embodiments, it may be necessary to additionally set up the color temperature sensor.

In some embodiments, the one or more parameters are input into the scene classification model, and the scene classification model determines a confidence level that the current shooting scene is an underwater scene comprising: determining weights corresponding to the one or more parameters based on the values of the one or more parameters, wherein the values of the different parameters have different correspondences with the weights; and determining a confidence level that the underwater scene is an underwater scene based on the weights corresponding to the one or more parameters.

In some embodiments, determining a confidence level for the underwater scene based on the weights corresponding to the one or more parameters comprises: multiplying the weights corresponding to the one or more parameters cumulatively; and determining a confidence level for the underwater scene based on the result of the cumulative multiplication.

In some embodiments, determining a confidence level of the underwater scene based on the weights corresponding to the one or more parameters further comprises: adjusting the confidence level of the underwater scene based on the energy percentage of different bands; adjusting the confidence level of the underwater scene downwardly when the percentage of the energy of the near-infrared band and/or the red band is relatively high; and adjusting the confidence level of the underwater scene upwardly when the percentage of the energy of the blue-violet band is relatively high.

In some embodiments, determining the confidence level of the underwater scene based on the weights corresponding to the one or more parameters further comprises: performing a time domain filtering process on the confidence level that the current shooting scene is an underwater scene based on the confidence level that the previous frame or frames of the shooting scene adjacent to the current frame of the shooting scene in time is an underwater scene.

In some embodiments, performing a white balance process on the original image based on the identification results includes: obtaining a first white balance gain based on an overwater scene white balance process for the original image captured of the current shooting scene; obtaining a second white balance gain based on an underwater scene white balance process for the original image captured of the current shooting scene; fusing the first white balance gain and the second white balance gain to obtain a third white balance gain, wherein a weight ratio of the first white balance gain and the second white balance gain in the fusion is determined based on a confidence level; and the white balance process is performed on the original image of the current shooting scene based on the third white balance gain to obtain a processed image of the current shooting scene.

In some embodiments, performing a white balance process on the original image based on the identification result further comprises: performing a white balance correction of the first white balance gain and/or the second white balance gain before fusing the first white balance gain and the second white balance gain to obtain a third white balance gain.

In some embodiments, white balance processing of the original image based on the identification result further comprises: obtaining at least one of a color temperature value, a luminance value, or a hue value of the original image, and determining a coefficient for white balance correction based on the at least one of the color temperature value, the luminance value, or the hue value.

In some embodiments, performing a white balance process on the original image based on the identification results further comprises: determining a confidence level of an underwater scene of a previous frame of the shooting scene that is temporally adjacent to the current frame of the shooting scene; and filtering the processed image based on the difference between the confidence level of the previous frame of the shooting scene and the confidence level of the current frame of the shooting scene to adjust the convergence speed of the white balance process.

In some embodiments, when the confidence level of the scene captured in the previous frame is greater than the confidence level of the scene captured in the current frame, filtering is performed on the processed image to increase the convergence speed of the white balance process; when the confidence level of the scene captured in the previous frame is less than the confidence level of the scene captured in the current frame, filtering is performed on the processed image to decrease the convergence speed of the white balance process.

In some embodiments, performing a white balance process on the original image based on the identification results further comprises: adjusting exposure parameters of the original image based on the identification results.

According to embodiments of the present disclosure, there is also provided a non-transitory, computer-readable storage medium 1000 on which is stored a computer program 1100 which, when executed by a computer, is capable of realizing the method 100, 200, or 700 of any of the embodiments as described above, with reference to the relevant descriptions above for the specific technical details, which will not be repeated herein.

A computer-readable storage medium is any type of physical memory that can store processor-readable information or data. Accordingly, a computer-readable storage medium may store instructions for execution by one or more processors, including instructions for causing a processor to perform steps or stages consistent with the embodiments described herein. Computer-readable media include non-volatile and volatile media as well as removable and non-removable media, wherein the information storage may be implemented by any method or technique. The information may be modules of computer-readable instructions, data structures and programs, or other data. Examples of non-transitory computer-readable media include, but are not limited to: phase-change random access memory (PRAM), static random access memory (SRAM), dynamic random access memory (DRAM), other types of random access memory (RAM), read-only memory (ROM), electrically erasable programmable read-only memory (EEPROM), flash memory, or other memory technologies, Compact Disc Read-Only Memory (CD-ROM), Digital Versatile Disk (DVD) or other optical memory, cassette, tape or disk memory or other magnetic storage device, cache, registers, or any other non-transport media that can be used to store information that can be accessed by a computer device. Computer-readable storage media are non-transitory and do not include transitory media such as modulated data signals and carriers.

Although examples and features of the disclosed principles are described herein, modifications, adaptations, and other implementations are possible without departing from the spirit and scope of the disclosed embodiments. In addition, the words "comprising," "having," "containing," and "including," and other similar forms, are intended to be equivalent in meaning and are open-ended, and the item or items following any of these words are not intended to be an exhaustive list of such item or items, nor are they intended to be limited to the item or items listed. It must also be noted that, as used herein and in the appended claims, the singular forms "one," "a," and "the" include the plural unless the context clearly indicates otherwise.

It should be understood that the present disclosure is not limited to the exact structure as already described above and illustrated in the accompanying drawings, and that various modifications and variations may be made without departing from the scope of the present disclosure. It is intended that the scope of the present disclosure should be limited only by the appended claims.

What is claimed is:

1. An imaging device comprising:

at least one imaging sensor configured to obtain an original image of a current shooting scene;

at least one color temperature sensor configured to collect color temperature data of the current shooting scene;

at least one processor; and at least one memory including computer program code, wherein the at least one memory and the computer program code are configured, with the at least one processor, to cause the device to at least:

identify a result of identification of the current shooting scene, wherein the result of identification associates with scene type including in an underwater scene or not in an underwater scene; and in response to the result of identification indicating that the current shooting scene is shifted from the underwater scene to an overwater scene, increase a convergence speed of a white balance process.

2. The imaging device according to claim 1, wherein to identify the result of identification of the current shooting scene, the at least one memory and the computer program code are further configured, with the at least one processor, to cause the device to at least:

input color temperature data into a scene classification model, the scene classification model determining a confidence level that the current shooting scene is the underwater scene.

3. The imaging device according to claim 2, wherein to identify the result of identification of the current shooting scene, the at least one memory and the computer program code are further configured, with the at least one processor, to cause the device to at least:

determine validity of the color temperature data before inputting the color temperature data into the scene classification model, wherein to determine the validity of the color temperature data, the at least one memory and the computer program code are further configured, with the at least one processor, to cause the device to at least:

compare the color temperature data with a preset color temperature range and determine that the color temperature data is valid in response to that the color temperature data is within the preset color temperature range; or calculate a difference between a point in time at which the color temperature data is captured by the color temperature sensor and a point in time at which the color temperature data captured by the color temperature sensor is obtained by the processor, and determine that the color temperature data is valid in response to that the difference is less than or equal to a preset threshold.

4. The imaging device according to claim 2, wherein the at least one memory and the computer program code are further configured, with the at least one processor, to cause the device to at least:

filter the color temperature data to reject anomalous color temperature data points before inputting the color temperature data into the scene classification model.

5. The imaging device according to claim 2, wherein the at least one memory and the computer program code are further configured, with the at least one processor, to cause the device to at least:

before inputting the color temperature data into the scene classification model, normalize values of all channels in the color temperature data using a value of a green band channel or a full band channel in the color temperature data as a base value.

6. The imaging device according to claim 2, wherein to identify the result of identification of the current shooting scene, the at least one memory and the computer program code are further configured, with the at least one processor, to cause the device to at least:

obtain one or more parameters of the original image, the one or more parameters including at least one of an underwater area percentage, an overwater area percentage, a color temperature value or a luminance value; and input the one or more parameters together with the color temperature data into the scene classification model, the scene classification model determining the confidence level that the current shooting scene is the underwater scene.

7. The imaging device according to claim 6, wherein the underwater area percentage and the overwater area percentage are determined according to a predetermined RGB range of the underwater scene and a predetermined RGB range of an overwater scene, respectively.

8. The imaging device according to claim 6, wherein the one or more parameters further include an energy percentage in different wavelength bands, the energy percentage in different wavelength bands being determined based on the color temperature data.

9. The imaging device according to claim 6, wherein to determine the confidence level that the current shooting scene is the underwater scene by inputting the one or more parameters together with the color temperature data into the scene classification model, the at least one memory and the computer program code are further configured, with the at least one processor, to cause the device to at least:

determine a first confidence level that the current shooting scene is the underwater scene based on the color temperature data;

determine a second confidence level that the current shooting scene is the underwater scene based on the one or more parameters; and determine the confidence level that the current shooting scene is the underwater scene based on the first confidence level and the second confidence level using the scene classification model.

10. The imaging device according to claim 9, wherein to determine the second confidence level that the current shooting scene is the underwater scene based on the one or more parameters, the at least one memory and the computer program code are further configured, with the at least one processor, to cause the device to at least:

determine weights corresponding to the one or more parameters based on values of the one or more parameters, wherein the values of different parameters have different correspondences with the weights; and determine the second confidence level based on the weights corresponding to the one or more parameters.

11. The imaging device according to claim 10, wherein to determine the second confidence level based on weights corresponding to the one or more parameters, the at least one memory and the computer program code are further configured, with the at least one processor, to cause the device to at least:

perform cumulative multiplication of the weights corresponding to the one or more parameters, and determine the second confidence level based on a result of the cumulative multiplication; or adjust the second confidence level based on the energy percentage of different bands, including:

in response to that an energy percentage of near-infrared band and/or red band is relatively higher than other bands, decrease the second confidence level; or in response to that an energy percentage of a blue-violet band is relatively higher than other bands, increase the second confidence level.

12. The imaging device according to claim 2, wherein to determine the confidence level that the current shooting scene is the underwater scene, the at least one memory and the computer program code are further configured, with the at least one processor, to cause the device to at least:

perform a time domain filtering on the confidence level that the current shooting scene is the underwater scene based on a confidence level that a previous frame or frames of a shooting scene adjacent to a current frame of the current shooting scene in time is the underwater scene.

13. The imaging device according to claim 2, wherein the at least one memory and the computer program code are further configured, with the at least one processor, to cause the device to at least:

obtain a first white balance gain for the original image captured for the current shooting scene based on an overwater scene white balance process;

obtain a second white balance gain for the original image captured for the current shooting scene based on an underwater scene white balance process;

fuse the first white balance gain and the second gain to obtain a third white balance gain, wherein a proportion of weights of the first white balance gain and the second white balance gain at a time of fusion is determined based on the confidence level; and perform the white balance process on the original image of the current shooting scene based on the third white balance gain to obtain the processed image of the current shooting scene.

14. The imaging device according to claim 13, wherein the at least one memory and the computer program code are further configured, with the at least one processor, to cause the device to at least:

perform white balance correction on at least one of the first white balance gain or the second white balance gain before fusing the first white balance gain and the second white balance gain to obtain the third white balance gain.

15. The imaging device according to claim 14, wherein the at least one memory and the computer program code are further configured, with the at least one processor, to cause the device to at least:

obtain at least one of a color temperature value, a luminance value or a hue value of the original image; and determine a coefficient for the white balance correction based on the at least one of the color temperature value, the luminance value or the hue value.

16. The imaging device according to claim 2, wherein the at least one memory and the computer program code are further configured, with the at least one processor, to cause the device to at least:

determine a confidence level of an underwater scene of a previous frame of a shooting scene that is temporally adjacent to a current frame of the current shooting scene; and based on a difference between the confidence level of the previous frame of the shooting scene and the confidence level of the current frame of the current shooting scene, filter the processed image to adjust a convergence speed of the white balance process.

17. The imaging device according to claim 1, wherein the at least one memory and the computer program code are further configured, with the at least one processor, to cause the device to at least:

in response to the result of identification indicating that the current shooting scene is shifted from the overwater scene to the underwater scene, reduce the convergence speed of the white balance process.

18. A imaging method, comprising:

obtaining an original image of a current shooting scene;

identifying a result of identification of the current shooting scene, wherein the result of identification associates with scene type including in an underwater scene or not in an underwater scene, and the color temperature data is obtained by a color temperature sensor on the current shooting scene; and in response to the result of identification of the current shooting scene indicating that the current shooting scene is shifted from the underwater scene to an overwater scene, increasing a convergence speed of a white balance process.

19. The method according to claim 18, wherein identifying the result of identification of the current shooting scene includes:

inputting color temperature data into a scene classification model, the scene classification model determining a confidence level that the current shooting scene is the underwater scene.

20. An imaging device comprising:

at least one imaging sensor configured to obtain an original image of a current shooting scene;

at least one color temperature sensor configured to collect color temperature data of the current shooting scene;

at least one processor; and at least one memory including computer program code, wherein the at least one memory and the computer program code are configured, with the at least one processor, to cause the device to at least:

identify a result of identification of the current shooting scene based on the color temperature data, wherein the result of identification associates with scene type including in an underwater scene or not in an underwater scene, and identifying the result of identification of the current shooting scene based on the color temperature data includes:

inputting the color temperature data into a scene classification model, the scene classification model determining a confidence level that the current shooting scene is the underwater scene; and perform a white balance process on the original image based on the result of identification to obtain a processed image of the current shooting scene.

* * * * *